(12) United States Patent
Ochs et al.

(10) Patent No.: US 10,601,348 B2
(45) Date of Patent: Mar. 24, 2020

(54) SENSOR-LESS CONTROL OF AN ELECTRIC MOTOR

(71) Applicant: GM Global Technology Operations LLC, Detroit, MI (US)

(72) Inventors: David S. Ochs, Troy, MI (US); Anno Yoo, Rochester, MI (US); Kibok Lee, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 15/879,633

(22) Filed: Jan. 25, 2018

(65) Prior Publication Data

US 2019/0229653 A1 Jul. 25, 2019

(51) Int. Cl.
| | |
|---|---|
| *H02P 6/15* | (2016.01) |
| *G01D 5/244* | (2006.01) |
| *H02P 6/182* | (2016.01) |
| *H02P 6/17* | (2016.01) |
| *H02P 6/18* | (2016.01) |
| *H02P 6/16* | (2016.01) |

(52) U.S. Cl.
CPC ......... *H02P 6/157* (2016.02); *G01D 5/24404* (2013.01); *G01D 5/24485* (2013.01); *H02P 6/16* (2013.01); *H02P 6/17* (2016.02); *H02P 6/18* (2013.01); *H02P 6/182* (2013.01); *H02P 2203/05* (2013.01)

(58) Field of Classification Search
CPC . H02P 6/157; H02P 6/17; H02P 6/182; G01D 5/24404; G01D 5/24485; G01R 31/343; G01R 31/3651; G01R 31/362; B60L 3/0061
See application file for complete search history.

(56) References Cited

U.S. PATENT DOCUMENTS

| | | | |
|---|---|---|---|
| 7,002,318 B1* | 2/2006 | Schulz | B60L 3/0038 318/437 |
| 2012/0098476 A1* | 4/2012 | Chiu | G05B 19/39 318/639 |

(Continued)

OTHER PUBLICATIONS

Gilbert et al., "A Sensor Fault Detection and Isolation Method in Interior Permanent-Magnet Synchronous Motor Drives Based on an Extended Kalman Filter" Aug. 2013, IEEE transcations on industrial electronics, vol. 60 No. 8 (Year: 2013).*

*Primary Examiner* — Tung X Nguyen
*Assistant Examiner* — Feba Pothen

(57) ABSTRACT

A switching module switches between receiving a first output from a sensor and a second output from a sensor-less position detection module each indicating a rotor position error of a motor. A position determining module determines a rotor position of the motor based on an output of the switching module and generates a control signal to control a parameter of the motor. A sample and hold module operates on a sum of the output of the switching module and an output of the sample and hold module from a prior instance of switching between the first and second outputs. The position determining module scales the output of the sample and hold module using first and second gains to generate first and second scaled outputs, and generates the control signal based on the output of the switching module and the first and second scaled outputs.

20 Claims, 10 Drawing Sheets

(56) References Cited

U.S. PATENT DOCUMENTS

2014/0055067 A1\* 2/2014 Kuroda .............. H02P 23/0077
  318/400.32
2016/0329849 A1\* 11/2016 Nakajima .............. G01R 23/00

\* cited by examiner

SENSOR-LESS CONTROL OF AN ELECTRIC MOTOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally control systems for electric motors and more particularly to sensor-less control of electric motors.

Electric motors (hereinafter motors) are used in many applications. Examples of the applications include electric vehicles, a variety of industrial equipment, home appliances, power generation systems, and so on. Various methods are employed to control the speed of the motors. For example, a position sensor is used to sense rotor position, and the sensed rotor position is fed back to a control system to control the speed of the motor.

SUMMARY

A system comprises a switching module configured to switch between receiving a first output from a sensor indicating a rotor position error of a motor and receiving a second output from a sensor-less position detection module indicating the rotor position error of the motor. The system further comprises a position determining module configured to determine a rotor position of the motor based on an output of the switching module and to generate a control signal to control a parameter of the motor. The system further comprises a sample and hold module configured to perform a sample and hold operation when the switching module switches between the first and second outputs, the sample and hold operation being performed on a sum of the output of the switching module and an output of the sample and hold module from a prior instance of switching between the first and second outputs. The position determining module is further configured to scale the output of the sample and hold module using first and second gains to generate first and second scaled outputs, and to generate the control signal based on the output of the switching module and the first and second scaled outputs. The first and second gains control a response of the position determining module to a disturbance generated when the switching module switches between the first and second outputs.

In other features, the first and second gains control the response of the position determining module within a predetermined range.

In other features, the system further comprises a control module configured to control the parameter of the motor based on the control signal. The parameter of the motor includes speed, position, or torque of the motor.

In other features, the position determining module comprises a proportional-integral-derivative controller. The first and second gains respectively include proportional and derivative gains. The position determining module is further configured to scale the output of the switching module using a third gain to generate a third scaled output. The third gain includes an integral gain, and to generate the control signal based on the first, second, and third scaled outputs.

In other features, the system further comprises a control module configured to adjust a bandwidth of the position determining module as a function of a rotor flux frequency of the motor.

In other features, the position determining module comprises a proportional-integral-derivative controller. The first and second gains and a third gain respectively include proportional, derivative, and integral gains. The position determining module is further configured to receive a feedforward signal indicating a torque of the motor, scale the output of the switching module using the third gain to generate a third scaled output, and generate the control signal based on the feedforward signal and the first, second, and third scaled outputs.

In other features, the system further comprises a filter module configured to filter the first output and to generate a filtered output when the switching module switches from the first output to the second output while a transient from a prior switch from the second output to the first output is occurring. The sample and hold module is further configured to perform the sample and hold operation on the sum with the filtered output subtracted from the sum to cancel the transient.

In other features, the system further comprises a control module configured to trigger the switching module to switch from the first output to the second output when the sensor fails and to control the motor based on the control signal.

In other features, the system further comprises the sensor-less position detection module configured to detect the rotor position error of the motor by using back electromotive force from the motor or by using high frequency injection, and to provide an indication of the rotor position error of the motor.

In other features, the system further comprises the sensor configured to sense a rotor position of the motor, and a position error detection module configured to provide an indication of the rotor position error of the motor based on the sensed rotor position and the control signal generated by the position determining module.

In other features, the system further comprises the sensor-less position detection module configured to detect the rotor position error of the motor by using back electromotive force from the motor or by using high frequency injection, and to provide an indication of the rotor position error of the motor. The system further comprises a second sample and hold module configured to perform a sample and hold operation on a sum of the indication of the rotor position error and an output of the second sample and hold module. The system further comprises a second position determining module configured to generate the second output based on the indication of the rotor position error and the output of the second sample and hold module.

In other features, the system further comprises a control module configured to trigger the second sample and hold module when the switching module switches from the first output to the second output after providing the first output for greater than or equal to a predetermined period of time.

In other features, the system further comprises a control module configured to trigger the sample and hold module when the switching module switches from the second output to the first output.

In other features, the system further comprises a control module configured to trigger the sample and hold module when the switching module switches from the first output to the second output after providing the first output for less than or equal to a predetermined period of time.

In other features, the system further comprises a control module configured to adjust a bandwidth of the second position determining module as a function of a rotor flux frequency of the motor.

In other features, the system further comprises a filter module configured to filter the first output and to generate a filtered output when the switching module switches from the first output to the second output while a transient from a prior switch from the second output to the first output is occurring. The sample and hold module is further configured to perform the sample and hold operation on the sum with the filtered output subtracted from the sum to cancel the transient.

In other features, the system further comprises the sensor-less position detection module configured to detect the rotor position error of the motor by using back electromotive force from the motor or by using high frequency injection, and to provide an indication of the rotor position error of the motor. The system further comprises a second sample and hold module configured to perform a sample and hold operation on a sum of the indication of the rotor position error and an output of the second sample and hold module. The system further comprises a second position determining module configured to generate the second output based on the indication of the rotor position error and the output of the second sample and hold module. The system further comprises a control module configured to trigger the second sample and hold module when the switching module switches from the first output to the second output after providing the first output for greater than or equal to a predetermined period of time, and to trigger the sample and hold module when the switching module switches from the second output to the first output or when the switching module switches from the first output to the second output after providing the first output for less than the predetermined period of time. The system further comprises a filter module configured to filter the first output and to generate a filtered output when the switching module switches from the first output to the second output while a transient from a prior switch from the second output to the first output is occurring. The sample and hold module is further configured to perform the sample and hold operation on the sum with the filtered output subtracted from the sum to cancel the transient.

In other features, the system further comprises a control module configured to control a maximum torque command to control a torque of the motor in direct proportion to a rotor flux frequency of the motor when the switching module switches from the first output to the second output.

In other features, the system further comprises a control module configured to control a slew rate of a torque of the motor up to a predetermined maximum slew rate limit in direct proportion to a rotor flux frequency of the motor when the switching module switches from the first output to the second output.

In other features, the system further comprises a control module configured to control the first and second gains and a third gain used to scale the output of the switching module as functions of a rotor flux frequency of the motor when the switching module switches from the first output to the second output.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In control systems, a state observer provides an estimate of an internal state of a system from measurements of inputs and outputs of the system. The internal state of the system can be used to solve control theory problems (e.g., stabilizing the system using internal state feedback). Sometimes the internal state of a system cannot be determined by direct observation. Instead, indirect effects of the internal state of the system are observed from system outputs. If the system is observable based on system outputs, the internal state of the system can be reconstructed from measurements of the system outputs using the state observer.

In a control system for controlling a motor, a sensor-based control uses a position sensor to detect rotor position (i.e., rotor angle), which is used to control a parameter of the motor such as speed, position, or torque of the motor. However, the position sensor can fail. When the position sensor fails, the control system has to shut down the motor or switch to a backup source of position information. A sensor-less control uses a backup position signal from a closed-loop state observer that is driven by other feedback signals.

The present disclosure proposes systems and methods for making a smooth transition between sensor-based and sensor-less operation, and for maintaining stable control during sensor-less operation at low frequencies. The present disclosure proposes changes to a motor control system that are made to ensure system stability at lowest possible motor speed using back-EMF-based sensor-less control. Specifically, as explained below, during sensor-less operation, the systems and methods can modify one or more of torque capability, torque slew rate, and various gains of a position observer and/or a motion state filter as a function of motor speed.

Accordingly, the systems and methods can prevent the motor from being shut down above a low speed threshold in the event of a position sensor failure. The systems and methods enable a smooth transition between sensor-based and sensor-less operation, which allows for more retries to ride through intermittent position sensor failures. The systems and methods are valid for a large class of proportional-integral (PI) and proportional-integral-derivative (PID) type state observers and state filters (e.g., motion state filters used for sensor-less control and phase locked loops used for utility grid synchronization).

Figure 1:
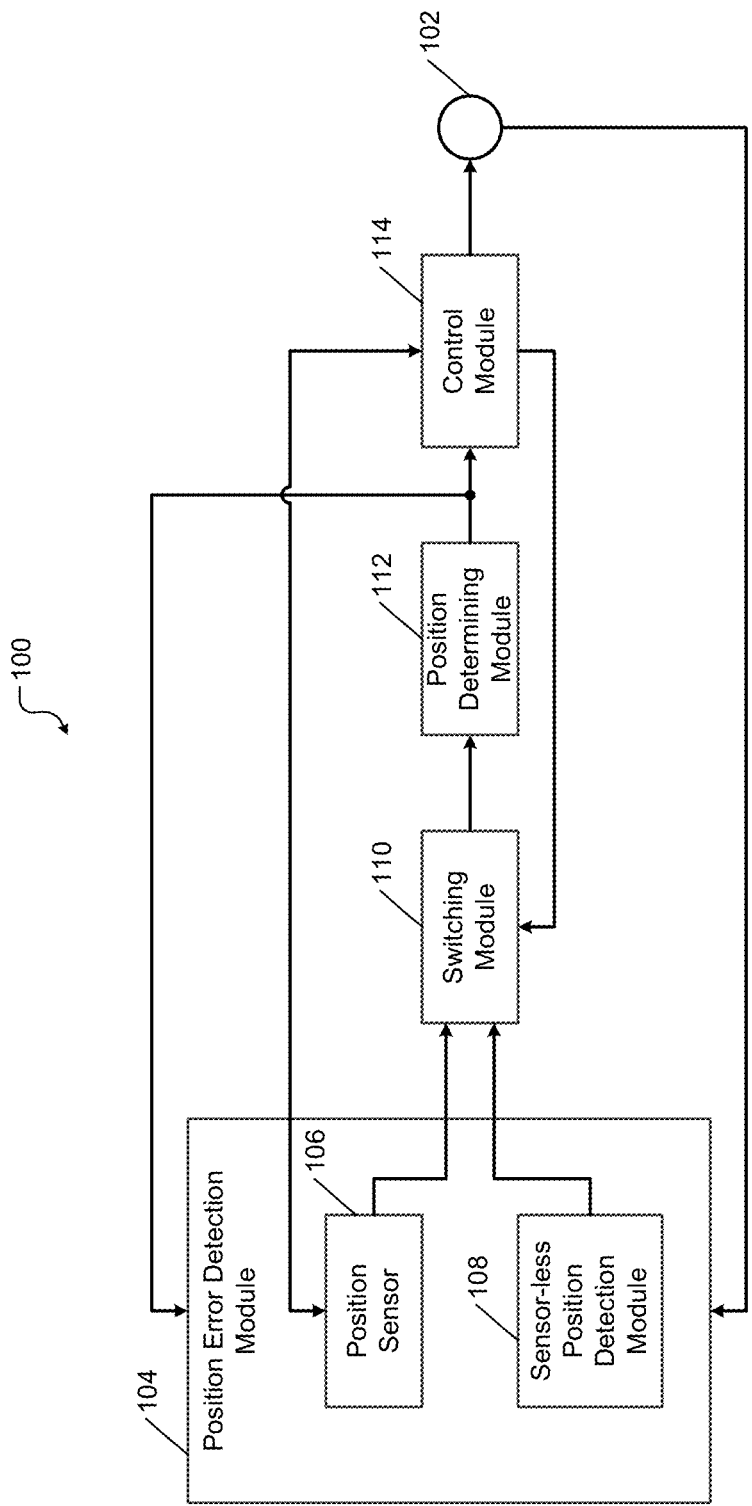
FIG. 1 is a functional block diagram of a system for controlling a motor using sensor-based and senor-less control according to the present disclosure.

FIG. 1 shows an overview of a system 100 for controlling a motor 102 using sensor-based and senor-less control and smoothly switching between sensor-based and senor-less control. The system 100 comprises the motor 102, a position error detection module 104 comprising a position sensor 106 and a sensor-less position detection module 108, a switching module 110, a position determining module 112, and a control module 114.

The position error detection module 104 detects a rotor position error (i.e., an error in a rotor position or a rotor angle) of the motor 102 using data from the position determining module 112 and the position sensor 106. The sensor-less position detection module 108 detects the rotor position error by using back-EMF from the motor 102 and/or high frequency injection. The rotor position error detected by the sensor-less position detection module 108 is used to determine the rotor position when the position sensor 106 fails or develops a fault.

The switching module 110 switches between receiving the rotor position error data from the position sensor 106 or from the sensor-less position detection module 108. The control module 114 detects when the position sensor 106 fails. When the position sensor 106 fails, the control module 114 provides an indication of the failure of the position sensor 106 to the switching module 110.

When the switching module 110 receives the indication of the failure of the position sensor 106, the switching module 110 switches the source for receiving the rotor position error data. When the position sensor 106 fails, the switching module 110 switches from the position sensor 106 to the sensor-less position detection module 108 and receives the rotor position error data from the sensor-less position detection module 108. When the position sensor 106 operates properly, the switching module 110 switches from the sensor-less position detection module 108 to the position sensor 106 and receives the rotor position error data from the position sensor 106.

The position determining module 112 comprises a position observer or a motion state filter (MSF). As explained below in detail, the position determining module 112 determines the rotor position (i.e., the rotor angle) based on the rotor position error data received from the switching module 110 and generates a control signal indicating the determined rotor position. The control module 114 controls the motor 102 based on the rotor position determined by the position determining module 112. That is, the control module 114 controls the motor 102 based on the control signal generated by the position determining module 112.

Figure 2:
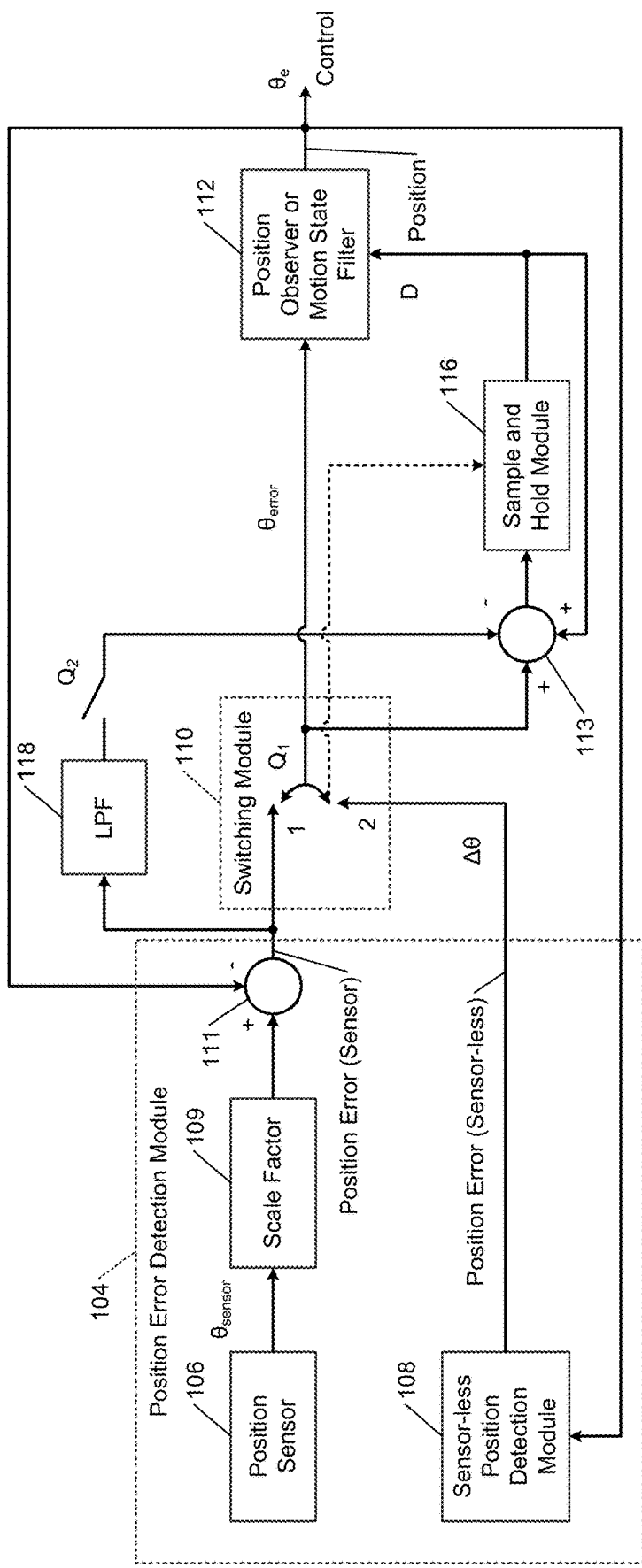
FIG. 2 shows the system of FIG. 1 is further detail.

FIG. 2 shows the system 100 in further detail. In addition to the elements of the system 100 shown in FIG. 1, FIG. 2 shows that the system 100 further comprises a scale factor 109, first and second combiners 111 and 113, a low-pass filter (LPF) 118, and a sample and hold module 116. The operations of these additional elements of the system 100 are described below in detail.

Figure 3:
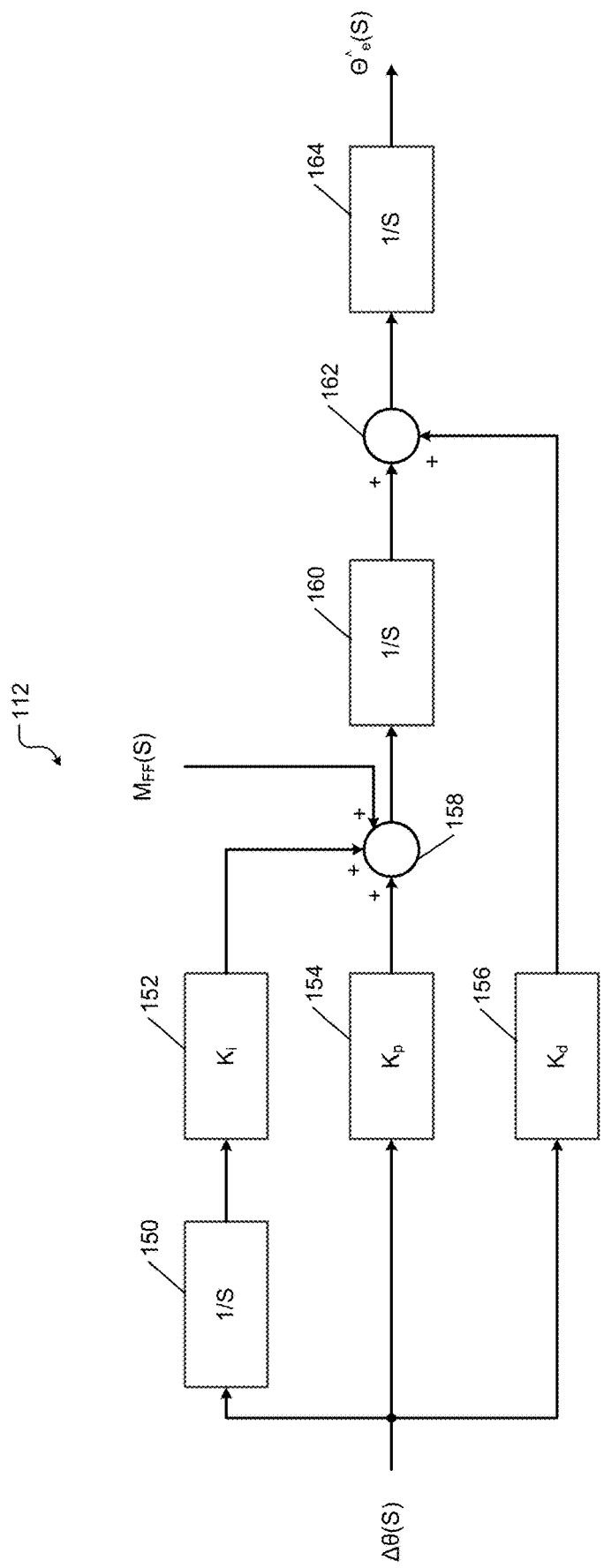
FIG. 3 shows an example of a position determining module used in the system of FIGS. 1 and 2.

Throughout the present disclosure, the position determining module 112 is shown as a position observer or a motion state filter. FIG. 3 shows an example of the position determining module 112. In the example shown, the position determining module 112 includes elements 150-164. When a torque feedforward term MFF(s) term is included as shown, the position determining module 112 is called a position observer or a motion observer. When the torque feedforward term MFF(s) term is excluded, the position determining module 112 is called a motion state filter.

FIG. 3 shows that the position determining module 112 comprises a PID controller to process an input (e.g., the output of the switching module 110). The PID controller of the position determining module 112 comprises an integral path with an integral path gain $K_i$, a proportional path with a proportional path gain $K_p$, and a derivative path with a derivative path gain $K_d$. The PID controller of the position determining module 112 processes the input using the gains and generates an output (e.g., the control signal of the position determining module 112).

In FIG. 2, an output of the position sensor 106 is scaled using the scale factor 109 to generate a scaled output of the position sensor 106. The first combiner 111 combines the scaled output of the position sensor 106 and the control signal output by the position determining module 112 and generates a first combined signal that is output to the switching module 110. The first combined signal represents a first position error signal generated based on the output of the position sensor 106 and is shown as Position Error (Sensor). The sensor-less position detection module 108 detects the rotor position error and generates a second position error signal shown as Position Error (Sensor-less). The second position error signal generated by the sensor-less position detection module 108 is used by the position determining module 112 to determine the rotor position when the position sensor 106 fails or develops a fault.

Throughout the present disclosure, the first position error signal is referred to as a first output from the position sensor 106, which is a first output of the position error detection module 104 generated based on the output of the position sensor 106. Further, the second position error signal is referred to as a second output from the sensor-less position detection module 108, which is a second output of the position error detection module 104 generated based on the output of the sensor-less position detection module 108.

The switching module 110 comprises a switch Q1 that switches between the output of the first combiner 111 (i.e., the first output of the position error detection module 104 generated based on the output of the position sensor 106) and the output of the sensor-less position detection module 108 (i.e., the second output of the position error detection module 104 generated based on the output of the sensor-less position detection module 108). The switch Q1 is controlled by the control module 114 as explained below. The position determining module 112 receives the output of the switching module 110 via the switch Q1.

The output of the switching module 110 (i.e., the output of the switch Q1) is also provided to the second combiner 113. The LPF 118 filters the first combined signal (i.e., the first output of the position error detection module 104 generated based on the output of the position sensor 106) and generates a filtered output. The filtered output of the LPF 118 is provided to the second combiner 113 via a switch Q2. The switch Q2 is controlled by the control module 114 as explained below.

The sample and hold module 116 receives the output of the second combiner 113 and generates an output that is provided to the position determining module 112. The position determining module 112 generates the control signal indicating the rotor position based on the output of the switching module 110 and the output of the sample and hold module 116. The output of the sample and hold module 116 is also fed back to the second combiner 113 as explained below. The sample and hold module 116, the LPF 118, and the position determining module 112 smooth out any transients resulting from the switching module 110 switching between the first and second outputs as explained below in detail.

When the switch Q1 is in position 1, the rotor position error detected by the position sensor 106 drives the position determining module 112 (i.e., the motion state filter or the position observer). When the switch Q1 is in position 2, the rotor position error detected by the sensor-less position detection module 108 drives the position determining module 112 (i.e., the motion state filter or the position observer).

When the switching module 110 switches between the first and second outputs (i.e., the outputs of the position error detection module 104 generated based on the outputs of the position sensor 106 and the sensor-less position detection module 108), a position error ($\theta_{error}$) seen by the position determining module 112 changes instantaneously. If the change in the position error ($\theta_{error}$) is large enough, the change can disturb the current control of the motor 102, leading to a torque disturbance and/or an over-current fault. For these reasons, it is desirable to make the transition between the rotor position error sources (i.e., between the first and second outputs of the position error detection module 104) smooth and somewhat slower than if no transition is used. The system 100 shown in FIG. 2 accomplishes these objectives as follows.

When the switch Q1 changes states (i.e., when the switching module 110 switches between the first and second outputs of the position error detection module 104), the position error ($\theta_{error}$) at the instant of the switching is captured by the sample and hold module 116 and added to a previous decoupling term (D) (i.e., an output of the sample and hold module 116 at a prior switching operation performed by the switching module 110). The decoupling term (D) captures the disturbance to the motion observer or position observer (i.e., the position determining module 112) caused by a change at its input (i.e., by the switching module 110 switching between the first and second outputs of the position error detection module 104).

Figure 4:
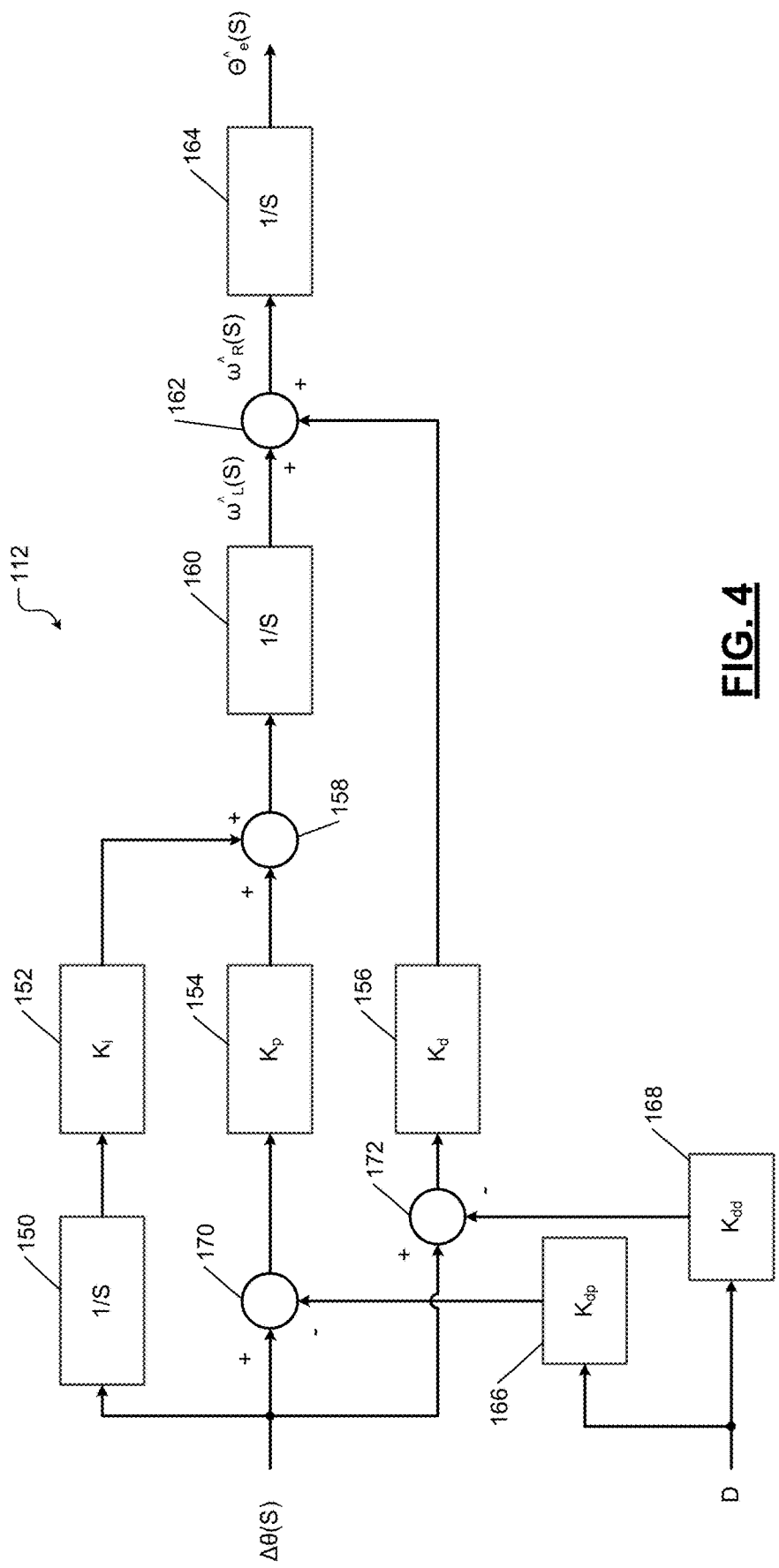
FIG. 4 shows application of a decoupling term D to the position determining module of FIGS. 1-3.

FIG. 4 shows how the decoupling term D is applied in the position determining module 112 that includes elements 150-172. Although the position determining module 112 is shown as a position observer (i.e., without the torque feedforward term MFF(s) term), it should be understood that the teachings of the present disclosure, whether shown using a position observer or a motion state filter, apply equally to both the position observer and the motion state filter.

The decoupling term D is multiplied by two different gains: the gain for the proportional path and the gain for the derivative path. The resulting product terms are subtracted from the respective paths. The resulting disturbance response transfer function of the position determining module 112 is given by the following equation:

$$\frac{\hat{\theta}}{D} = \frac{s^2 K_d (1 - K_{dd}) + s K_p (1 - K_{dp}) + K_i}{s^3 + s^2 K_d + s K_p + K_i}$$

The above equation shows that the decoupling terms $D*K_{dp}$ and $D*K_{dd}$ move the zeros of the disturbance response transfer function of the position determining module 112. Accordingly, the disturbance response of the position determining module 112 can be tuned or adjusted by varying the decoupling terms $K_{dp}$ and $K_{dd}$. The decoupling term D is not multiplied by the gain for the integral path (i.e., the integral path of the position determining module 112 is not decoupled.

Figure 5:
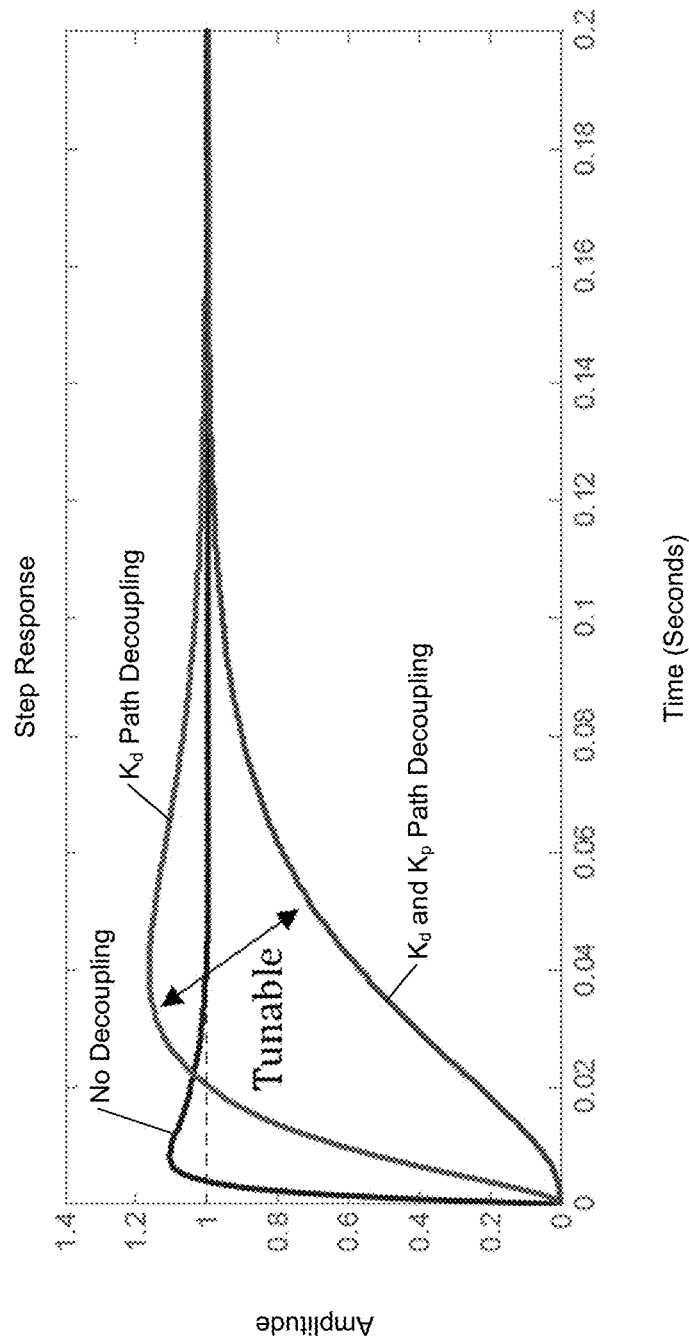
FIG. 5 illustrates effects of varying decoupling terms on a disturbance step response of the position determining module.

FIG. 5 shows how varying the amounts of the decoupling terms $K_{dp}$ and $K_{dd}$ affects the disturbance step response of the position determining module 112. The disturbance response of the position determining module 112 can be tuned (i.e., adjusted) within a predetermined range shown as "Tunable" by varying the decoupling terms $K_{dp}$ and $K_{dd}$. The disturbance response of the position determining module 112 is smooth and slower relative to the disturbance response without decoupling (shown as "No Decoupling").

The system 100 handles any rapid switching between sensor-based and senor-less operation (i.e., between first and second outputs) that may be caused by an intermittent fault in the position sensor 106 as follows. If a transition to the sensor-less operation is commanded by the control module 114 while a transient from a previous transition to the sensor-based operation is still occurring, a filtered error (i.e., the output of the LPF 118) is subtracted from the decoupling term (i.e., the output of the sample and hold module 116) at the instant of the transition. This is represented in FIG. 2 as closing the switch Q2. This has the effect of cancelling whatever portion of a previous transient response (due to switching from sensor-less to sensor-based operation) that has not yet settled. The error to be subtracted is filtered in case the sensor-based position data is being corrupted by a fault in the position sensor 106 that is necessitating the transition back to the sensor-less operation.

Since the disturbance is only captured once per transition (i.e., at the time of the transition), the decoupling terms never have to be removed. The position determining module 112 automatically adapts, and the position and speed ($\hat{\theta}_e$ and $\hat{\omega}_R$) output by the position determining module 112 have no error in steady state. While $\hat{\omega}_L$ may have steady state error as a function of the decoupling term D, $\hat{\omega}_L$ is not used in many control systems.

The above decoupling procedure can be extended to control systems that use multiple motion state filters (MSF's) in cascade. For example, two cascaded MSF's may be used in the sensor-less operation to provide more filtering of the rotor angle. The general rule is to decouple the error for whichever MSF will see a disturbance due to the transition between sensor-based and sensor-less operation. When a transition to the sensor-less operation is commanded by the control module 114 soon (e.g., in less than a predetermined time period) after a transition to the sensor-based operation, the filtered error should be subtracted from the decoupling term applied to whichever MSF is decoupled at the time of transition back to the sensor-less operation.

Figure 6:
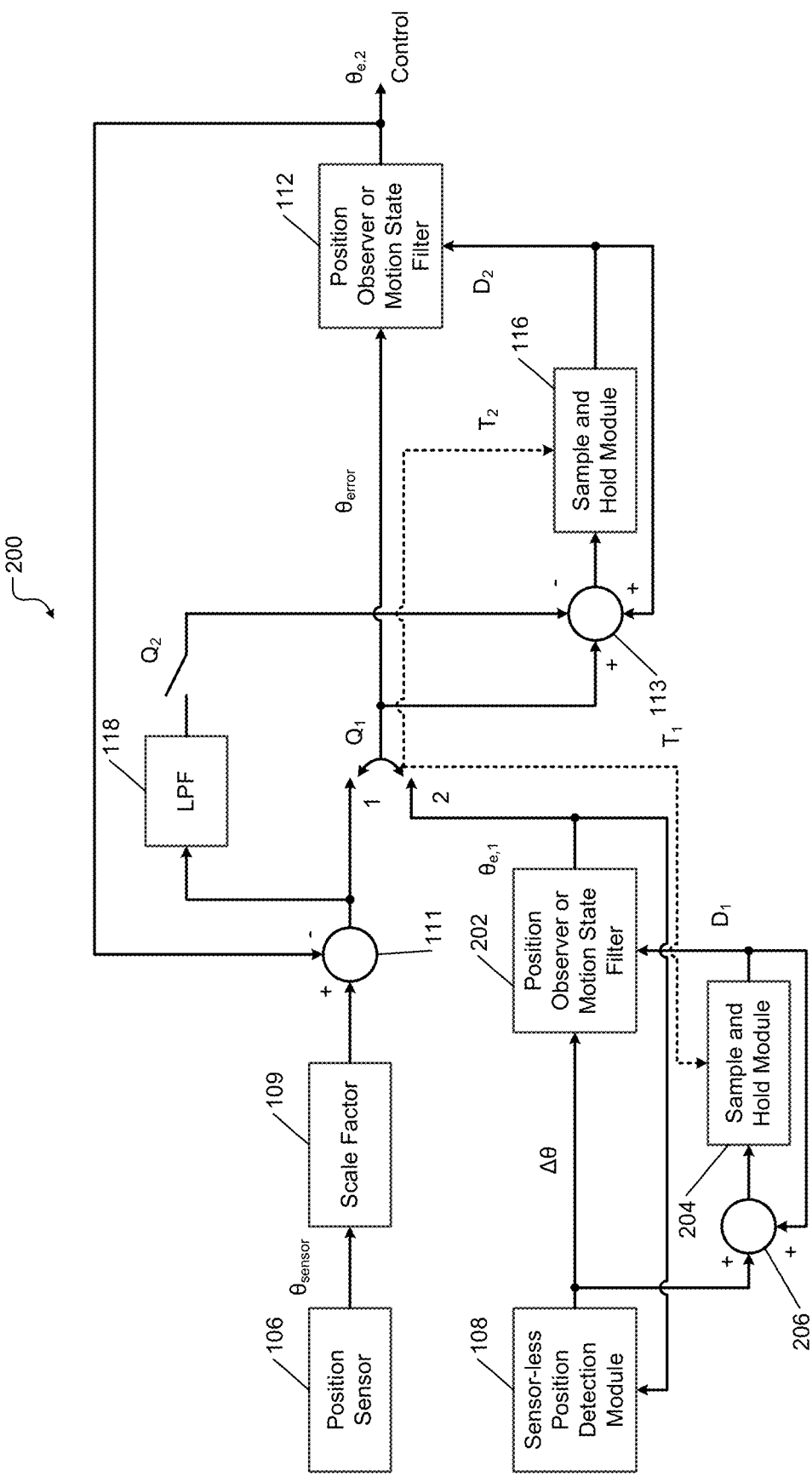
FIG. 6 shows an example of a system for controlling a motor using two cascaded position determining modules.

FIG. 6 shows an example of a system 200 comprising two cascaded MSF's. The system 200 comprises the elements shown in FIGS. 1 and 2 and further comprises a second position determining module 202 cascaded to the position determining module 112 as shown. The system 200 further comprises a second sample and hold module 204 and a third combiner 206 that are connected to the second position determining module 202 and the sensor-less position detection module 108 as shown.

The system 200 performs decoupling during switching between first and second outputs as follows. A trigger signal T1 for the sample and hold module 204 is asserted by the control module 114 when the switch Q1 changes from state 1 (i.e., sensor-based operation) to state 2 (i.e., sensor-less operation) (e.g., due to a failure of the position sensor 106) after operating in state 1 for a relatively long time (e.g., for greater than a predetermined time period) (i.e., no transient is occurring due to a transition from state 2 to state 1).

A trigger signal T2 for the sample and hold module 116 is asserted by the control module 114 under any of the following two circumstances: First, when the switch Q1 changes from state 2 (i.e., sensor-less operation) to state 1 (i.e., sensor-based operation) (e.g., due to recovery from a failure of the position sensor 106); and second, when the switch Q1 changes from state 1 to state 2 after operating in state 1 for a relatively short time (e.g., for less than a predetermined time period) (i.e. during a transient caused by a recent transition from state 2 to state 1). The switch Q2 is also closed in the second scenario.

The decoupling methods of the present disclosure are applicable to a wide range of state filters and observers. For example, the decoupling methods of the present disclosure can be included in a phase-locked loop used to detect rotor angle and rotor flux frequency in a power grid.

Figure 7:
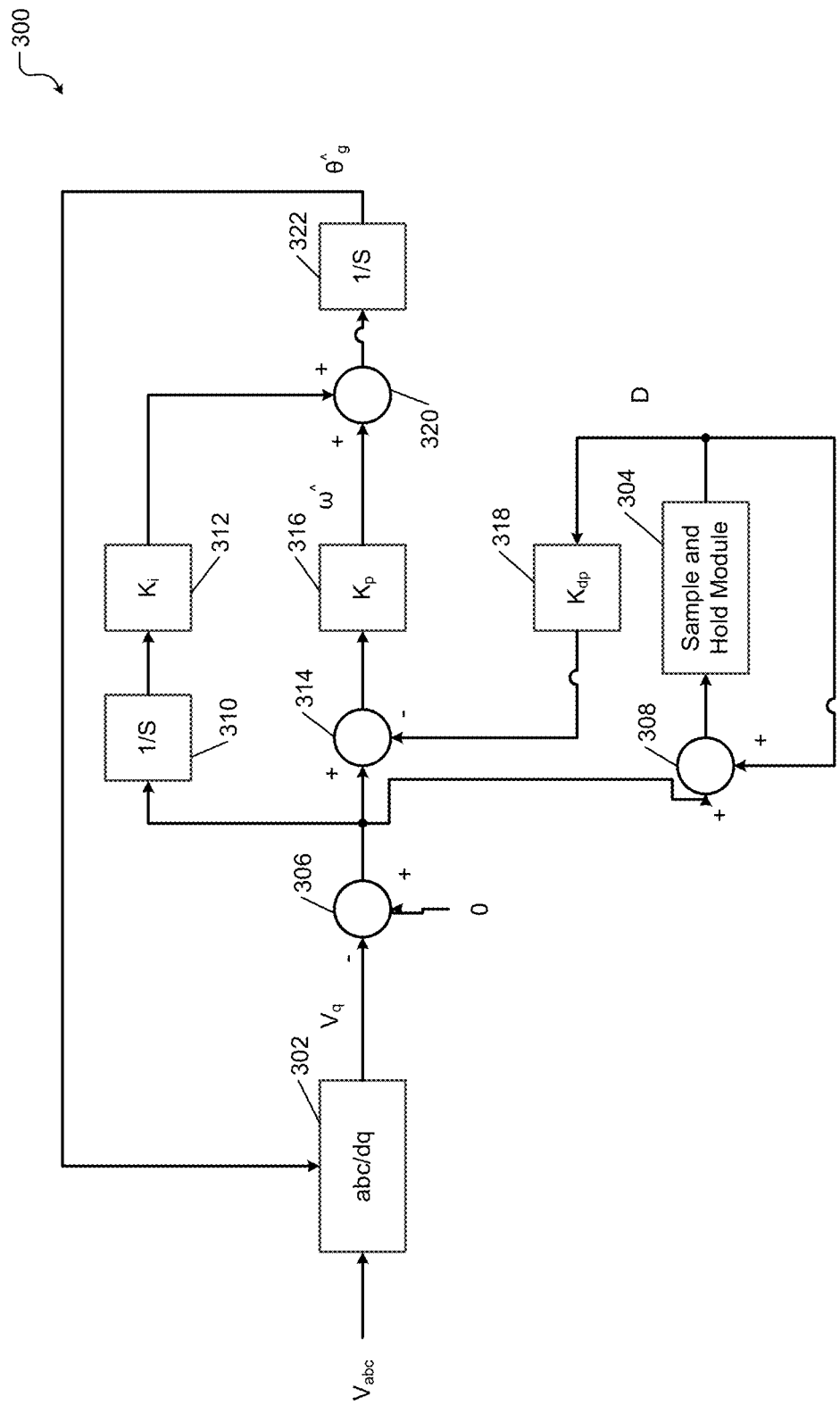
FIG. 7 shows an example of a use case of the system of the present disclosure in a power grid.

FIG. 7 shows an example of a system 300 for a power grid. The system 300 comprises a three-phase to synchronous reference frame converter 302 and a sample and hold converter module 304 that are connected to a PI controller including elements 306-322 as shown. The three-phase to synchronous reference frame converter 302 transforms three-phase sinusoidal variables (a, b, and c) into a synchronous (d and q) reference frame. The sample and hold module 304 can be triggered when a known disturbance is applied to the power grid (e.g., when a large load is turned on or a new power generation operation begins). The decoupling methods of the present disclosure can also be used to smooth out transitions between sensor-less methods (e.g., high frequency injection to back-EMF and vice versa).

In addition to smoothing the transition between sensor-based and sensor-less operation, the systems and methods of the present disclosure can maintain control using back-EMF-based sensor-less operation down to the lowest possible motor speed. The back-EMF-based sensor-less operation uses a model of the motor 102 along with feedback and command signals to estimate an error between a back-EMF angle and the rotor angle being used by the control system. The back-EMF-based sensor-less operation methods can break down at low (i.e., near zero) rotor flux frequencies because the back-EMF, which is proportional to the rotor flux frequency, can become unobservable at low (i.e., near zero) rotor flux frequencies.

The present disclosure proposes the following three modifications to the motor control system to limit the degradation at low (i.e., near zero) rotor flux frequencies: A first modification includes modifying a maximum torque command limit as a function of rotor flux frequency. A second modification includes modifying a torque slew rate as a function of rotor flux frequency. A third modification includes modifying the gains ($K_i$, $K_p$, $K_d$) of the motion state filter or the position observer (i.e., the gains of the position determining module 112) as a function of the rotor flux frequency. These modifications are explained below.

Figure 8:
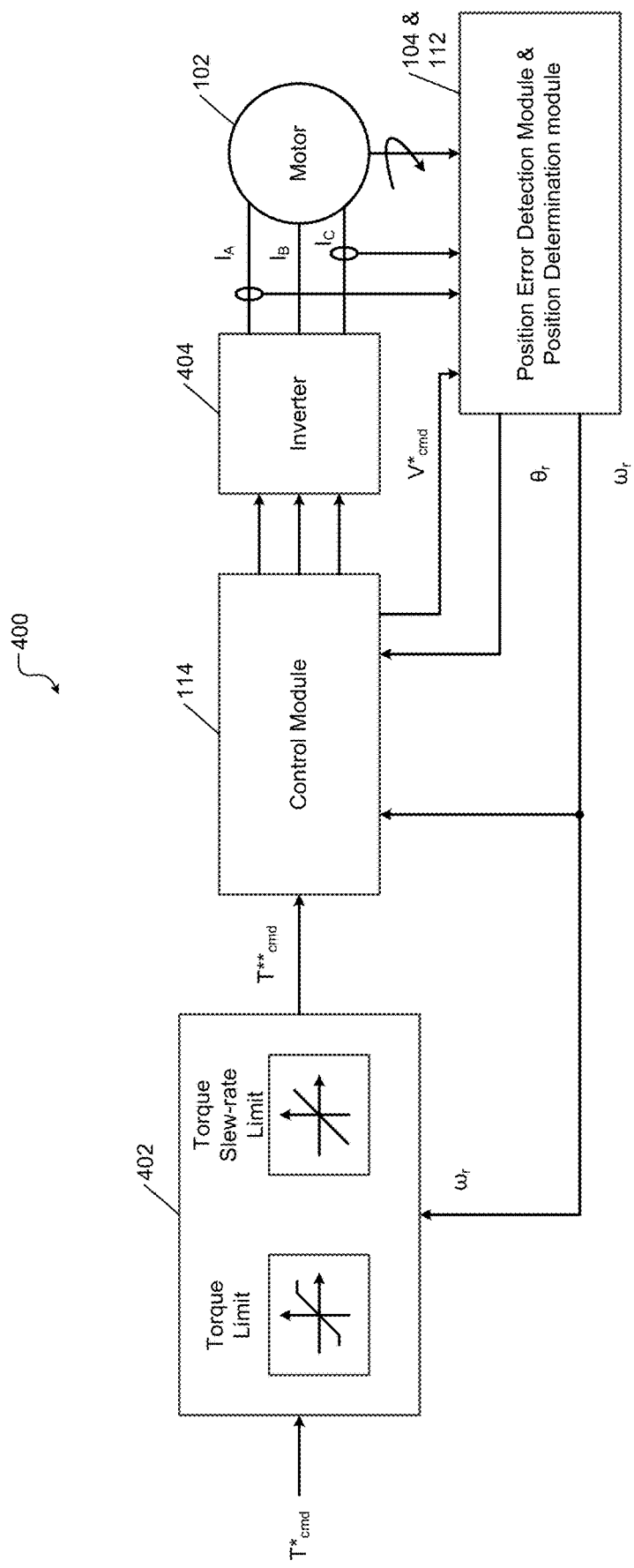
FIG. 8 shows a system for adjusting maximum torque and torque slew rate of the motor as a function of rotor flux frequency.

FIG. 8 shows a system 400 where the maximum torque command and the torque slew rate are adjusted as a function of the rotor flux frequency. For clarity, FIG. 8 shows only the control module 114, the position error detection module 104, and the position determining module 112 from the systems 100 and 200. However, the system 400 comprises all the elements of the systems 100 and 200. The system 400 further comprises a torque and slew-rate limiting module 402 that is connected to the control module 114, the position error detection module 104, and the position determining module 112 as shown. An inverter 404 drives the motor 102 according to control signals received from the control module 114.

The maximum torque command is modified as a function of rotor flux frequency as follows. As the rotor flux frequency decreases, the maximum torque command is reduced. Accordingly, the motor control system can have additional margin to over-current threshold. This modification during the sensor-less operation can reduce chances of overcurrent shut down of the motor 102.

The torque slew rate is modified as a function of rotor flux frequency as follows. The sensor-less operation basically assumes that the error of the estimated speed and the estimated position is small enough and can be ignored. However, if the torque slew rate is very high, this assumption may be unreasonable. Therefore, the sensor-less operation can degrade at high torque slew rates. Accordingly, the sensor-less operation can be stabilized by limiting the torque slew rate as a function of the rotor flux frequency.

Figure 9:
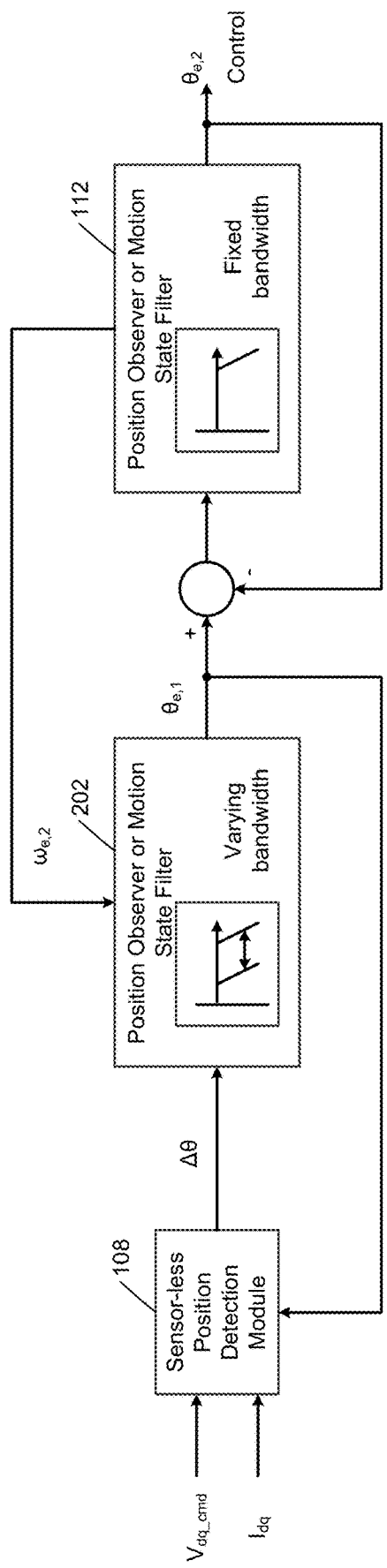
FIG. 9 shows a system for adjusting gains and bandwidth of the position determining module as a function of rotor flux frequency.

The gains (Ki, Kp, Kd) of the motion state filter or the position observer (i.e., the gains of the position determining module 112) can be modified as a function of the rotor flux frequency as follows. In FIG. 9, the error $\Delta\theta$ (i.e., the rotor angle error or the rotor position error) can include higher-order harmonic components of the rotor flux frequency. The bandwidth of the motion state filter or the position observer (e.g., the position determining module 202) is adjusted as a function of the rotor flux frequency by monitoring the rotor flux frequency to remove the higher-order harmonic components of the rotor flux frequency. The bandwidth of the other motion state filter or the position observer (i.e., the position determining module 112) is fixed. Element 190 combines outputs of elements 202 and 112 and inputs the result to element 112. In general, the gains can be decreased as the rotor flux frequency decreases and can be limited to minimum and maximum values. In FIG. 2, the bandwidth of the motion state filter or the position observer (i.e., the position determining module 112) can be adjusted as a function of the rotor flux frequency by monitoring the rotor flux frequency to remove higher-order harmonic components of the rotor flux frequency.

Figure 10:
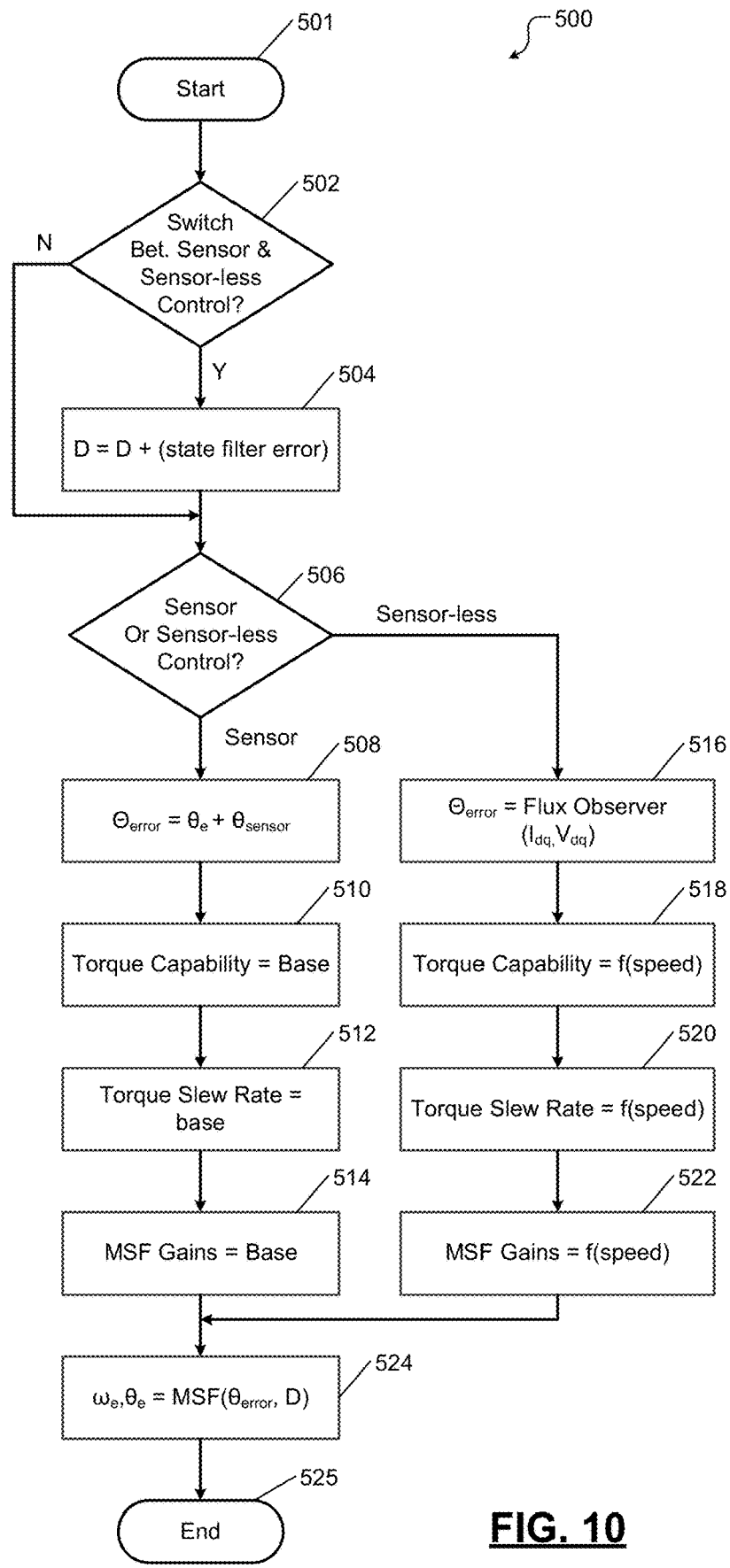
FIG. 10 shows a method for smoothing a response of the position determining module when switching between sensor-based and sensor-less control and for maintaining control during sensor-less operation using modified parameters.

FIG. 10 shows a method 500 for smoothing the response of the position determining module 112 when switching between the sensor-based and sensor-less operation and for maintaining control using the modifications to the motor control system. As used herein, the term control refers to one or more elements shown in the systems described above. The method 500 starts at 501 and ends at 525.

At 502, control determines whether to switch between sensor-based and sensor-less control (e.g., due to a failure of or recovery from failure of the position sensor 106). At 504, if control decides to switch between sensor-based and sensor-less control, control adds the position error at the instant of the switching (as captured by the sample and hold module 116) to a previous decoupling term (D) (i.e., an output of the sample and hold module 116 at a prior switching operation performed by the switching module 110).

At 506, control determines if sensor-based or sensor-less control is currently being used. If sensor-based control is currently being used, at 508, control sets the switch Q1 to position 1 and controls the motor 102 based on the combination of the first output from the position sensor 106 and the output of the position determining module 112. At 510, 512, and 514, control sets or uses base values (i.e., without the modifications described above) for the torque capability, the torque slew rate, and the gains for the position determining module 112 to control the motor 102.

If sensor-less control is currently being used, at 516, control sets the switch Q1 to position 2 and controls the motor 102 based on the second output from the sensor-less position detection module 108 (or the output of the position determining module 202 if cascading described above is used). At 518, 520, and 522, control sets or uses modified values (i.e., with the modifications as described above) for the torque capability, the torque slew rate, and the gains to control the motor 102.

At 524, whether sensor-based or sensor-less control is being used, control operates the motor 102 based on the output of the position determining module 112 using the values of the torque capability, the torque slew rate, and the gains that are selected according to whether the sensor-based or sensor-less control is being used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
 a switching module configured to switch between receiving a first output from a sensor indicating a rotor position error of a motor and receiving a second output from a sensor-less position detection module indicating a second rotor position error of the motor;
 a position determining module configured to determine a rotor position of the motor based on an output of the switching module and to generate a control signal to control a parameter of the motor; and
 a sample and hold module configured to perform a sample and hold operation when the switching module switches between the first and second outputs, the sample and hold operation being performed on a sum of the output of the switching module and an output of the sample and hold module from a prior instance of switching between the first and second outputs,
 wherein the position determining module is further configured to:
  scale the output of the sample and hold module using first and second gains to generate first and second scaled outputs; and
  generate the control signal based on the output of the switching module and the first and second scaled outputs,
  wherein the first and second gains control a response of the position determining module to a disturbance generated when the switching module switches between the first and second outputs.

2. The system of claim 1 wherein the first and second gains control the response of the position determining module within a predetermined range.

3. The system of claim 1 further comprising a control module configured to control the parameter of the motor based on the control signal, wherein the parameter of the motor includes speed, position, or torque of the motor.

4. The system of claim 1 wherein the position determining module comprises a proportional-integral-derivative controller, wherein the first and second gains respectively include proportional and derivative gains, and wherein the position determining module is further configured to:
 scale the output of the switching module using a third gain to generate a third scaled output, wherein the third gain includes an integral gain; and
 generate the control signal based on the first, second, and third scaled outputs.

5. The system of claim 1 further comprising a control module configured to adjust a bandwidth of the position determining module as a function of a rotor flux frequency of the motor.

6. The system of claim 1 wherein the position determining module comprises a proportional-integral-derivative controller; wherein the first and second gains and a third gain respectively include proportional, derivative, and integral gains; and wherein the position determining module is further configured to:
 receive a feedforward signal indicating a torque of the motor;
 scale the output of the switching module using the third gain to generate a third scaled output; and
 generate the control signal based on the feedforward signal and the first, second, and third scaled outputs.

7. The system of claim 1 further comprising:
 a filter module configured to filter the first output and to generate a filtered output when the switching module switches from the first output to the second output while a transient from a prior switch from the second output to the first output is occurring,
 wherein the sample and hold module is further configured to perform the sample and hold operation on the sum with the filtered output subtracted from the sum to cancel the transient.

8. The system of claim 1 further comprising a control module configured to trigger the switching module to switch from the first output to the second output when the sensor fails and to control the motor based on the control signal.

9. The system of claim 1 further comprising the sensor-less position detection module configured to detect the second rotor position error of the motor by using back electromotive force from the motor or by using high frequency injection, and to provide an indication of the second rotor position error of the motor.

10. The system of claim 1 further comprising:
 the sensor configured to sense a rotor position of the motor; and
 a position error detection module configured to provide an indication of the rotor position error of the motor based on the sensed rotor position and the control signal generated by the position determining module.

11. The system of claim 1 further comprising:
 the sensor-less position detection module configured to detect the second rotor position error of the motor by using back electromotive force from the motor or by using high frequency injection, and to provide an indication of the second rotor position error of the motor;

a second sample and hold module configured to perform a sample and hold operation on a sum of the indication of the second rotor position error and an output of the second sample and hold module; and a second position determining module configured to generate the second output based on the indication of the second rotor position error and the output of the second sample and hold module.

12. The system of claim 11 further comprising a control module configured to trigger the second sample and hold module when the switching module switches from the first output to the second output after providing the first output for greater than or equal to a predetermined period of time.

13. The system of claim 11 further comprising a control module configured to trigger the sample and hold module when the switching module switches from the second output to the first output.

14. The system of claim 11 further comprising a control module configured to trigger the sample and hold module when the switching module switches from the first output to the second output after providing the first output for less than or equal to a predetermined period of time.

15. The system of claim 11 further comprising a control module configured to adjust a bandwidth of the second position determining module as a function of a rotor flux frequency of the motor.

16. The system of claim 14 further comprising:

a filter module configured to filter the first output and to generate a filtered output when the switching module switches from the first output to the second output while a transient from a prior switch from the second output to the first output is occurring, wherein the sample and hold module is further configured to perform the sample and hold operation on the sum with the filtered output subtracted from the sum to cancel the transient.

17. The system of claim 1 further comprising:

the sensor-less position detection module configured to detect the second rotor position error of the motor by using back electromotive force from the motor or by using high frequency injection, and to provide an indication of the second rotor position error of the motor;

a second sample and hold module configured to perform a sample and hold operation on a sum of the indication of the second rotor position error and an output of the second sample and hold module;

a second position determining module configured to generate the second output based on the indication of the second rotor position error and the output of the second sample and hold module;

a control module configured to:

trigger the second sample and hold module when the switching module switches from the first output to the second output after providing the first output for greater than or equal to a predetermined period of time; and trigger the sample and hold module when the switching module switches from the second output to the first output or when the switching module switches from the first output to the second output after providing the first output for less than the predetermined period of time; and a filter module configured to filter the first output and to generate a filtered output when the switching module switches from the first output to the second output while a transient from a prior switch from the second output to the first output is occurring, wherein the sample and hold module is further configured to perform the sample and hold operation on the sum with the filtered output subtracted from the sum to cancel the transient.

18. The system of claim 1 further comprising a control module configured to control a maximum torque command to control a torque of the motor in direct proportion to a rotor flux frequency of the motor when the switching module switches from the first output to the second output.

19. The system of claim 1 further comprising a control module configured to control a slew rate of a torque of the motor up to a predetermined maximum slew rate limit in direct proportion to a rotor flux frequency of the motor when the switching module switches from the first output to the second output.

20. The system of claim 1 further comprising a control module configured to control the first and second gains and a third gain used to scale the output of the switching module as functions of a rotor flux frequency of the motor when the switching module switches from the first output to the second output.

* * * * *